United States Patent [19]

Lambooy

[11] Patent Number: 4,953,263
[45] Date of Patent: Sep. 4, 1990

[54] PROCESS FOR STUNNING LIVESTOCK

[75] Inventor: Elbert Lambooy, Veenendaal, Netherlands

[73] Assignee: Stichting Instituut Voor Veeteeltkundig Onderzoek "Schoonoord", Zeist, Netherlands

[21] Appl. No.: 411,899

[22] Filed: Sep. 25, 1989

Related U.S. Application Data

[63] Continuation-in-part of Ser. No. 240,755, Sep. 2, 1988, Pat. No. 4,875,253.

[51] Int. Cl.$^5$ .............................................. A22B 3/00
[52] U.S. Cl. ......................................... 17/1 E; 17/45
[58] Field of Search ................................... 17/1 E, 45

[56] References Cited

U.S. PATENT DOCUMENTS

| | | | |
|---|---|---|---|
| 4,031,591 | 6/1977 | Collins | 17/1 E |
| 4,495,676 | 1/1985 | Hartmetz, II | 17/1 E |

FOREIGN PATENT DOCUMENTS 673927 11/1963 Canada ................................. 17/1 E

*Primary Examiner*—Willis Little
*Attorney, Agent, or Firm*—Allegretti & Witcoff, Ltd.

[57] ABSTRACT

Process for stunning animals to be slaughtered by means of an interrupted electrical stunning alternating current surge of low frequency by introducing between stunning and sticking of the animal an intermittent alternating current surge the frequency of which is many times higher e.g. thousand times higher the frequency of the stunning current.

2 Claims, 1 Drawing Sheet

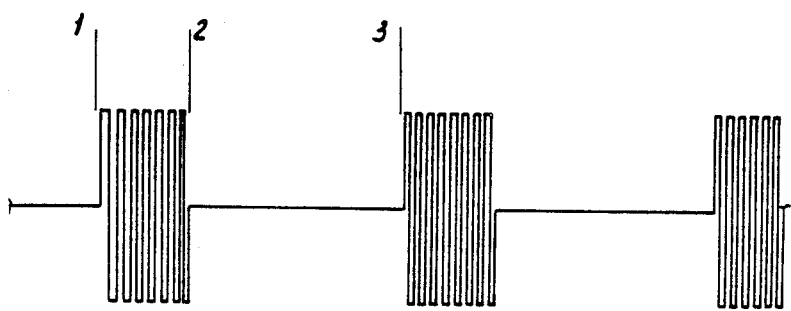

PROCESS FOR STUNNING LIVESTOCK

This application is a continuation-in-part of Ser. No. 240,755 filed Sept. 2, 1988, now U.S. Pat. No. 4,875,253.

BACKGROUND OF THE INVENTION

The invention relates to a process for stunning livestock, in particular pigs, by means of an electrical current surge which is transmitted briefly via electrodes to the animal to be stunned, and which can exhibit interruptions and is carried out at low frequency.

Such a process is generally known. For example, DE-A-21 35 900 discloses the application of a current surge which rises at a speed of 20 to 100 volts per millisecond to a voltage of 600 to 700 volts and has a frequency of 50 to 200 Hz.

It is known from the article entitled "Zum Einfluss der elektrischen Betaubung und des Ausblutens auf die Blutergusse in Schweinehalften" by P. T. Resetnikov that problems arise in the stunning of livestock, because internal bleeding occurs in a relatively large percentage of the animals to be stunned, as a result of which the meat of these animals is no longer acceptable for consumption and has to be processed as lower grade meat. In this article, it is stated that the stunning takes place with an alternating current of 50 Hz. This article is published in "Fleisch" 34 (1980) Vol. 4, pp. 70 and 71.

This article refers to a FEOS-U 4 unit which works with high-frequency alternating current. The article discusses research carried out in the USSR.

In the "Mitteilungsblatt" of the Bundesanstalt fur Fleischforschung, Kulmbach, "herausgegeben mit finanzieller Unterstutzung der Forderergesellschaft der Bundesanstalt fur Fleischforschung e.V.", No. 75 of Mar. 1, 1982, a reference is made on page 4937 to "Betaubungsfalle fur Schweine" (stunning trap for pigs), in which an alternating current generator is used with frequencies of 25 Hz or 2000 Hz.

The above-mentioned publications constitute only part of the literature which discusses the problem of electrically stunning livestock and the research carried out to achieve an apparatus with which the stunning current surge no longer produces the disadvantage of internal bleeding.

SUMMARY OF THE INVENTION

The object of the invention is to provide a process for accomplishing this purpose in which prior to sticking the animal, the stunning current surge is followed by an intermittent current surge the frequency of which is a multiple of that of the stunning current surge.

According to the invention, the stunning current surge is thus followed by a second intermittent current surge the frequency of which is preferably 250-3000 times or more the frequency of the stunning current surge. This second intermittent high-frequency current surge results in a muscle relaxation and the effect of little or no internal bleeding now occurring can most likely be ascribed to this. The earlier mentioned article by P. T. Resetnikov tells us that the internal bleeding can be assumed to be caused by muscle contractions.

It is stipulated by law that in electrical stunning apparatus for livestock the voltage must be higher than 240 volts and the current intensity must be higher than 1.27 amperes. The frequency is then generally between 50 and 200 Hz, as already stated. This can be a constant stunning current, i.e. with an uninterrupted vibration of the frequency set, or an intermittent current surge, consisting of a period of, for example 1 millisecond in which the frequenting current works and an interruption of, for example, 9 milliseconds.

When the intermittent second high-frequency current surge follows this, the muscle relaxation occurs. This current surge can also be described as "relaxation current".

In a stunning current surge with a frequency of 50 to 200 Hz the intermittent current surge or relaxation current has a frequency in the long wave radio frequency range, preferably in the range between 50 and 100 kHz. Thus, the relaxation current frequency may range from 250 to 3000 times the stunning current frequency.

The relaxation current surge must follow as quickly as possible after the stunning current surge, preferably within one second.

An article entitled "The Use of Electrical Stunning followed by Electro-Immobilization for the Humane Slaughter of Cattle" is known from the "New Zealand Veterinary Journal" of Jan. 22, 1985, and this article deals with calming the stunned animal after the stunning current surge, by means of a pulsating low-voltage current which is applied within 15 seconds for at least 30 seconds at a voltage of 80 volts and a frequency of 15 Hz after the throat is cut for bleeding. This achieves safer working, through calming of the stunned animal, and a certain degree of electrical stimulation to promote the tenderness of the meat, but it does not give the relaxation needed to limit internal bleeding before the throat is cut and after the stunning surge.

It is also pointed out that it is known to work with a pulsating current in the anaesthesia of humans and animals.

From the article "Elektroanesthesia" by Anthony Sances Jr. and Sanford J. Larson, published in Academic Press, New York, San Francisco, London 1975, it is known to work with a frequency of 100 Hz during an anaesthesia period of 10 to 20 minutes. Studies mentioned in this article concerning the wave form of the electrical current used in the anaesthesia go to 10 kHz, but state that power consumption is high at that high value. Lower values seem to be preferable.

From the article "The Use of Rectified High Frequency Current in Electrical Anaesthesia" by A. Limoge, published in the Proceedings of the First International Symposium, Graz, Austria, Sept. 12-17, 1966, and published as International Congress Series No. 136 by Excerpta Medica Foundation, it is known to superimpose a high-frequency intermittent current of 100 Hz on a low-frequency current intended for anaesthesia, where the frequency is of the order of magnitude of 100 Hz.

In anaesthesia it is not, however, a matter of treating animals which have to be slaughtered, but of putting humans or animals to sleep in such a way that operations can be performed painlessly. One cannot, therefore, conclude from this that the problem of internal bleeding occurring in slaughter animals when electrical stunning equipment is used can be solved by using an anaesthesia method which gets attention in surgery.

BRIEF DESCRIPTION OF THE DRAWING

The FIGURE of the drawing is a graphical representation of a frequency/time wave pattern illustrating the invention.

According to the invention, the high-frequency intermittent current surge has a cycle time of 10 milliseconds, a cycle time which is known per se in anaesthesia. This cycle time can have a current peak of at least one millisecond and an interruption time of no more than 9 milliseconds.

It is preferable to have a peak time of 3 milliseconds and an interruption time of 7 milliseconds.

DETAILED DESCRIPTION OF INVENTION

The high frequency intermittent surge is illustrated in the drawing in which the ordinate is the frequency, say 100 kHz, and the abscissa is time. The distance between numerals 1 and 2 represents the duration of the peak range, say 3 milliseconds, while the distance between numerals 2 and 3 represents the interruption time, say 7 milliseconds. Each cycle time should not exceed 10 milliseconds.

The stunning frequency generally ranges from 50 to 200 Hz, the voltage at least 240 and the amperage at least 1.27, in case the electrodes are placed on the head of the animal. The current can be constant or interrupted, for example 1 millisecond on and 9 milliseconds off, or 3 milliseconds on and 7 milliseconds off. The duration of the stunning current is 1 to 2 seconds.

In case the stunning electrodes are placed in the head to obtain direct brain stimulation the voltage may range from 25–100 with stunning currents from 150–400 milliamperes.

The relaxation current frequency ranges from 50 to 150 kHz, the voltage from 20 to 200 and amperage from 50 to 150 milliamperes. The current is interrupted, 1 to 3 seconds on, 5 to 9 seconds off, the total cycle time not exceeding 10 seconds. The duration of the relaxation current is from 1 to 4 seconds.

The following examples illustrate the parameters of the invention for stunning pigs and chickens prior to slaughtering.

|  | Duration (Seconds) | Intermittent Variation (Milliseconds) | | Frequency (Hz) | Voltage (Volts) | Current (Amperes) |
| --- | --- | --- | --- | --- | --- | --- |
|  |  | On | Off |  |  |  |
| Example 1 - Pigs |  |  |  |  |  |  |
| Stunning Current | 1 | 3 | 7 | 150 | 250 | 1.3 |
| Relaxation Current | 3–4 | 3 | 7 | 100,000 | 200 | 0.075 |
| Example 2 - Pigs |  |  |  |  |  |  |
| Stunning Current | 1 | 3 | 7 | 50 | 250 | 1.5 |
| Relaxation Current | 4 | 3 | 7 | 100,000 | 100 | 0.2 |
| Example 3 - Pigs |  |  |  |  |  |  |
| Stunning Current | 1 | 3 | 7 | 50 | 250 | 1.5 |
| Relaxation Current | 1 | 1 | 5 | 150,000 | 100 | 0.2 |
| Example 4 - Chickens |  |  |  |  |  |  |
| Stunning Current | 2 | 3 | 7 | 200 | 250 | 2.0 |
| Relaxation Current | 4 | 1 | 5 | 100,000 | 100 | 0.2 |

After stunning, under the conditions indicated, the animal or bird was stuck and subsequently examined for internal bleeding. In each case, the amount of internal bleeding was none or negligible, and the meat was acceptable for consumption. In accordance with the invention, the relaxation current surge is not superimposed on a current of lower frequency, as known in the case of anaesthesia, but follows it.

What is claimed is:

1. In a process for stunning livestock by means of a low frequency electrical current surge transmitted briefly through electrodes to the animal to be stunned, the improvement comprising prior to sticking the animal, administering a stunning alternating current surge followed by an intermittent alternating current surge, the frequency of which is a multiple of the frequency of the stunning current surge.

2. The process of claim 1 in which said multiple is 250.

* * * * *